US012683058B2

(12) United States Patent
Curuvija et al.

(10) Patent No.: US 12,683,058 B2
(45) **Date of Patent: *Jul. 14, 2026**

(54) LIQUID COOLED INDUCTOR

(71) Applicant: Ford Global Technologies, LLC, Dearborn, MI (US)

(72) Inventors: Boris Curuvija, West Bloomfield, MI (US); Baoming Ge, Okemos, MI (US); Lihua Chen, Farmington Hills, MI (US); Serdar Hakki Yonak, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 906 days.

This patent is subject to a terminal disclaimer.

(21) Appl. No.: 17/899,773

(22) Filed: Aug. 31, 2022

(65) Prior Publication Data

US 2022/0415556 A1 Dec. 29, 2022

Related U.S. Application Data

(62) Division of application No. 16/690,225, filed on Nov. 21, 2019, now Pat. No. 11,508,508.

(51) Int. Cl.

*H01F 27/10* (2006.01)
*H01F 27/02* (2006.01)
(Continued)

(52) U.S. Cl.

CPC ......... *H01F 27/10* (2013.01); *H01F 27/2876* (2013.01); *H01F 27/2895* (2013.01);
(Continued)

(58) Field of Classification Search

CPC .. H01F 27/10; H01F 27/2876; H01F 27/2895; H01F 27/02; H01F 27/306
(Continued)

(56) References Cited

U.S. PATENT DOCUMENTS 8,009,004 B2 * 8/2011 Ahangar ................ H01F 27/10 336/60
9,299,488 B2 * 3/2016 Shepard ................. H01F 27/06
(Continued)

FOREIGN PATENT DOCUMENTS

DE 102015203286 A1 9/2015
JP H11340047 A * 12/1999
(Continued)

*Primary Examiner* — Shawki S Ismail
*Assistant Examiner* — Joselito S. Baisa
(74) *Attorney, Agent, or Firm* — Brooks Kushman P.C.; David B. Kelley

(57) ABSTRACT

A vehicle, an inductor assembly for power electronics in a vehicle, and a method of providing and cooling an inductor assembly are provided. According to one example, the vehicle is provided with an inductor assembly in a vehicle electrical system with a variable voltage converter (VVC). The inductor assembly includes a core formed from a plurality of core segments spaced apart from one another to define gaps therebetween, with each of the plurality of core segments forming an internal fluid passage extending therethrough. The inductor assembly has a winding surrounding at least one of the plurality of core segments. A fluid system is connected to the core to provide pressurized fluid to the fluid passages of the plurality of core segments to circulate fluid through the core of the inductor assembly.

15 Claims, 5 Drawing Sheets

(51) Int. Cl.
*H01F 27/28* (2006.01)
*H01F 27/30* (2006.01)
*H01F 41/02* (2006.01)

(52) U.S. Cl.
CPC ............. *H01F 41/02* (2013.01); *H01F 27/02* (2013.01); *H01F 27/306* (2013.01)

(58) Field of Classification Search
USPC .......................................... 336/57, 58, 60, 61
See application file for complete search history.

(56) References Cited

U.S. PATENT DOCUMENTS

| | | | | |
|---|---|---|---|---|
| 9,524,820 | B2 | 12/2016 | Jacobson et al. | |
| 10,141,095 | B2 | 11/2018 | Skalski et al. | |
| 10,892,082 | B2 * | 1/2021 | Metzler | H01F 27/30 |
| 11,854,729 | B2 * | 12/2023 | Chen | H05K 7/20927 |
| 12,191,066 | B2 * | 1/2025 | Chen | H01F 27/08 |
| 12,500,028 | B2 * | 12/2025 | Nishizaka | H01F 27/263 |
| 2005/0259402 | A1 * | 11/2005 | Yasui | H05K 7/20927 361/699 |
| 2007/0295715 | A1 * | 12/2007 | Saka | H01F 27/22 219/624 |
| 2009/0322460 | A1 * | 12/2009 | Lin | H01F 30/16 336/62 |
| 2012/0075047 | A1 * | 3/2012 | Luckey | H01F 27/25 336/60 |
| 2012/0139683 | A1 * | 6/2012 | Salomaki | H01F 27/263 165/177 |
| 2013/0106556 | A1 * | 5/2013 | Suzuki | H01F 27/306 336/212 |
| 2014/0175867 | A1 | 6/2014 | Sung et al. | |

FOREIGN PATENT DOCUMENTS

| | | | | |
|---|---|---|---|---|
| JP | 2015126141 | A | 7/2015 | |
| WO | WO-9744796 | A1 * | 11/1997 | H01F 29/14 |

* cited by examiner

LIQUID COOLED INDUCTOR

CROSS-REFERENCE TO RELATED APPLICATIONS

This application is a division of U.S. application Ser. No. 16/690,225 filed Nov. 21, 2019, now U.S. Pat. No. 11,508, 508, the disclosure of which is hereby incorporated in its entirety by reference herein.

TECHNICAL FIELD

Various embodiments relate to an inductor assembly for a power converter in a vehicle, and thermal management of the inductor assembly.

BACKGROUND

Electrified vehicles including hybrid-electric vehicles (HEVs), plugin hybrid electric vehicles (PHEVs), and battery electric vehicles (BEVs) rely on a traction battery to provide power to a traction motor for propulsion and a power inverter therebetween to convert direct current (DC) power to alternating current (AC) power. Many electrified vehicles additionally include a DC-DC converter, also referred to as a variable voltage converter (VVC), to convert the voltage of the traction battery to an operational voltage level of the electric machine.

The voltage converter may be a buck-boost converter, with the voltage converter stepping up or increasing ("boosting") the output voltage magnitude in comparison to the input voltage magnitude, or stepping down or decreasing ("bucking") the output voltage magnitude in comparison to the input voltage magnitude. The DC-DC converter includes an inductor assembly, switches and diodes. In various examples, the inductor assembly generates heat during operation. Thermal management of the inductor, e.g. cooling, provides for an increase in the inductor performance and/or a reduction in size of the inductor.

Previously, the inductor assembly has been cooled via indirect liquid cooling by placing it in a housing, and thermally connecting and mounting the housing onto a cooling plate such that the inductor is cooled via conductive heat loss to the cooling plate and convective heat loss to the circulating fluid in the cooling plate. In this example, the fluid does not come into direct contact with the inductor assembly. Alternatively, the inductor assembly is cooled via direct liquid cooling by positioning an uncovered inductor assembly within a transmission case where transmission fluid within the transmission case can splash onto the inductor assembly before draining into the transmission sump. These active or passive methods cool the inductor from the outside of the inductor. However; the highest temperature region of the inductor may be internal to the inductor, and cooling fluid may only interact with an outer surface or outer housing of the inductor.

SUMMARY

In an embodiment, a vehicle is provided with an inductor assembly in a vehicle electrical system with a variable voltage converter (VVC). The inductor assembly includes a core formed from a plurality of core segments spaced apart from one another to define gaps therebetween, with each of the plurality of core segments forming an internal fluid passage extending therethrough. The inductor assembly has a winding surrounding at least one of the plurality of core segments. A fluid system is connected to the core to provide pressurized fluid to the fluid passages of the plurality of core segments to circulate fluid through the core of the inductor assembly.

In another embodiment, an inductor assembly for power electronics in a vehicle is provided. A core assembly has a first end yoke defining at least one internal fluid passage therethrough, and a second end yoke opposite to the first end yoke, with the second end yoke defining an internal fluid passage therethrough. The core assembly has a first series of core segments positioned between the first and second end yokes, with each of the segments being spaced apart from one another such that a gap is defined between adjacent segments. The core assembly has a second series of core segments positioned between the first and second end yokes, with each of the segments being spaced apart from one another such that a gap is defined between adjacent segments. The first end yoke, the first series of core segments, the second end yoke, and the second series of core segments are sequentially arranged into an annular structure. The internal fluid passages cooperate to define a fluid circuit through the core, the gaps between the first and second series of core segments in fluid communication with the fluid circuit. The first end yoke defines an inlet for the fluid circuit, with the inlet in fluid communication with the at least one internal fluid passage of the first end yoke. One of the first and second end yokes defines an outlet for the fluid circuit. The inductor assembly has a first winding surrounding the first series of core segments, and a second winding surrounding the second series of core segments.

In yet another embodiment, a method for providing and cooling an inductor assembly is provided. A first end yoke, a first series of core segments, a second end yoke, and a second series of core segments are positioned sequentially into an annular core assembly. Each of the first and second end yokes are formed to define an internal fluid passage therethrough. Each of the first and second series of core segments are formed to define an internal passage therethrough. Each of the segments of the first and second core segments are spaced apart from one another such that a gap is defined between adjacent segments. A first winding is provided about the first series of core segments. A second winding is provided about the second series of core segments to form an inductor assembly. Pressurized fluid is provided to a fluid circuit formed by the internal fluid passages of the first and second end yokes and the first and second series of core segments, wherein pressurized fluid is also provided into the gaps between adjacent core segments.

DETAILED DESCRIPTION

As required, detailed embodiments of the present disclosure are provided herein; however, it is to be understood that the disclosed embodiments are merely examples and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
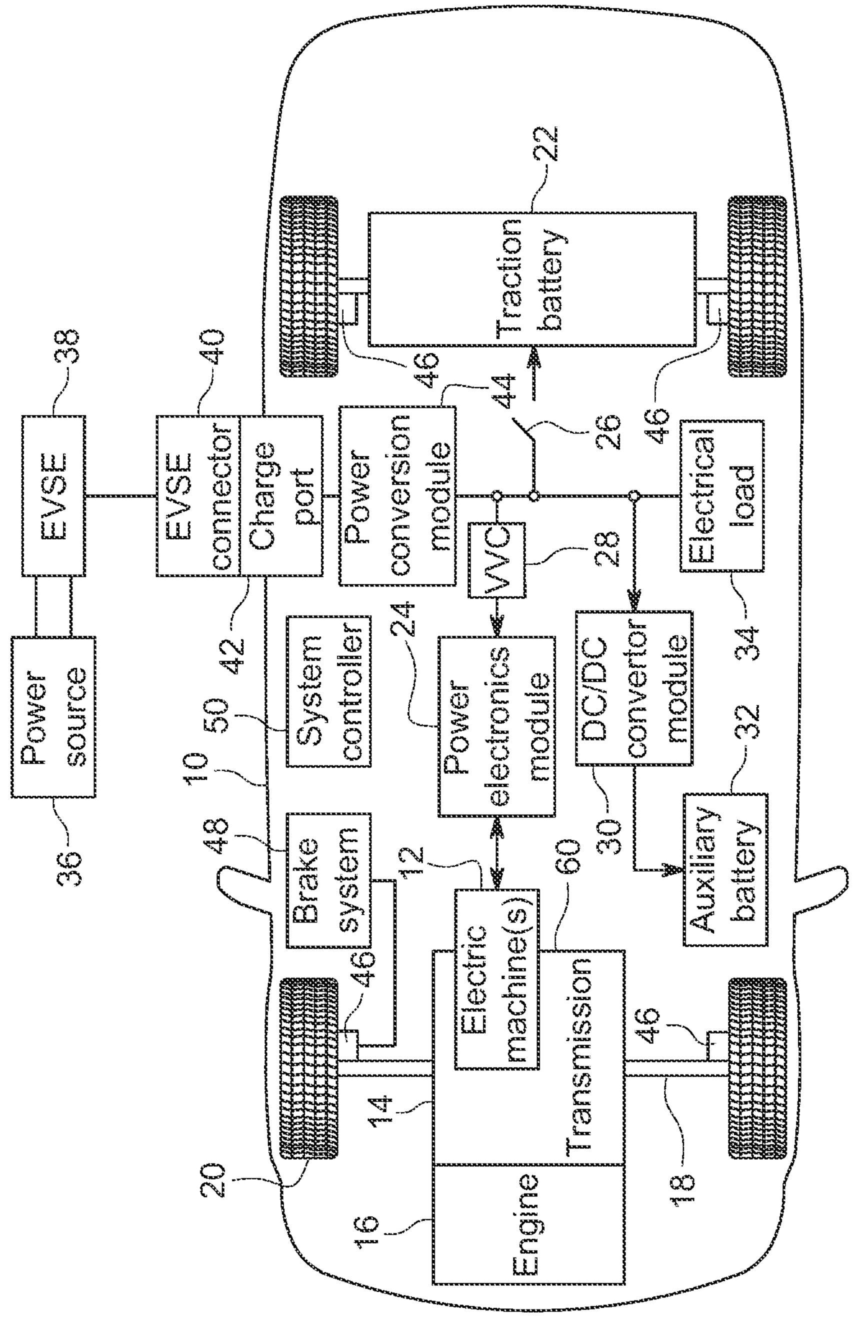
FIG. 1 illustrates a schematic of a vehicle according to an embodiment.

FIG. 1 illustrates a schematic of an electrified vehicle 10 that may be referred to as a plug-in hybrid-electric vehicle (PHEV). A plug-in hybrid-electric vehicle may comprise one or more electric machines 12 mechanically coupled to a hybrid transmission 14. The electric machines 12 may be capable of operating as a motor or a generator. In addition, the hybrid transmission 14 is mechanically coupled to an engine 16. The hybrid transmission 14 is also mechanically coupled to a drive shaft 18 that is mechanically coupled to the wheels 20. The electric machines 12 can provide propulsion and braking capability when the engine 16 is turned on or off. The electric machines 12 may also act as generators and can provide fuel economy benefits by recovering energy that would normally be lost as heat in a friction braking system. The electric machines 12 may also reduce vehicle emissions by allowing the engine 16 to operate at more efficient speeds and allowing the hybrid-electric vehicle 10 to be operated in electric mode with the engine 16 off under certain conditions. An electrified vehicle 10 may also be a battery electric vehicle (BEV). In a BEV configuration, the engine 16 may not be present. In other configurations, the electrified vehicle 10 may be a full hybrid-electric vehicle (FHEV) without plug-in capability, a micro-hybrid vehicle, a start-stop vehicle, or the like.

A traction battery or battery pack 22 stores energy that can be used by the electric machines 12. The vehicle battery pack 22 may provide a high voltage direct current (DC) output. The traction battery 22 may be electrically coupled to one or more power electronics modules 24. One or more contactors 26 may isolate the traction battery 22 from other components when opened and connect the traction battery 22 to other components when closed. The power electronics module 24 is also electrically coupled to the electric machines 12 and provides the ability to bi-directionally transfer energy between the traction battery 22 and the electric machines 12. For example, a traction battery 22 may provide a DC voltage while the electric machines 12 may operate with a three-phase alternating current (AC) to function. The power electronics module 24 may convert the DC current to a three-phase AC current to operate the electric machines 12. In a regenerative mode, the power electronics module 24 may convert the three-phase AC current from the electric machines 12 acting as generators to the DC current compatible with the traction battery 22.

The vehicle 10 may include a variable-voltage converter (VVC) 28 electrically coupled between the traction battery 22 and the power electronics module 24. The VVC 28 may be a DC/DC boost converter configured to increase or boost the voltage provided by the traction battery 22, or buck the voltage provided to the traction battery. By increasing the voltage, current requirements may be decreased leading to a reduction in wiring size for the power electronics module 24 and the electric machines 12. Further, the electric machines 12 may be operated with better efficiency and lower losses.

In addition to providing energy for propulsion, the traction battery 22 may provide energy for other vehicle electrical systems. The vehicle 10 may include a DC/DC converter module 30 that converts the high voltage DC output of the traction battery 22 to a low voltage DC supply that is compatible with low-voltage vehicle loads. An output of the DC/DC converter module 30 may be electrically coupled to an auxiliary battery 32 (e.g., 12V battery) for charging the auxiliary battery 32. The low-voltage systems may be electrically coupled to the auxiliary battery 32. One or more electrical loads 34 may be coupled to the high-voltage bus. The electrical loads 34 may have an associated controller that operates and controls the electrical loads 34 when appropriate. Examples of electrical loads 34 may be a fan, an electric heating element and/or an air-conditioning compressor.

The electrified vehicle 10 may be configured to recharge the traction battery 22 from an external power source 36. The external power source 36 may be a connection to an electrical outlet. The external power source 36 may be electrically coupled to a charger or electric vehicle supply equipment (EVSE) 38. The external power source 36 may be an electrical power distribution network or grid as provided by an electric utility company. The EVSE 38 may provide circuitry and controls to regulate and manage the transfer of energy between the power source 36 and the vehicle 10. The external power source 36 may provide DC or AC electric power to the EVSE 38. The EVSE 38 may have a charge connector 40 for plugging into a charge port 42 of the vehicle 10. The charge port 42 may be any type of port configured to transfer power from the EVSE 38 to the vehicle 10. The charge port 42 may be electrically coupled to a charger or on-board power conversion module 44. The power conversion module 44 may condition the power supplied from the EVSE 38 to provide the proper voltage and current levels to the traction battery 22. The power conversion module 44 may interface with the EVSE 38 to coordinate the delivery of power to the vehicle 10. The EVSE connector 40 may have pins that mate with corresponding recesses of the charge port 42. Alternatively, various components described as being electrically coupled or connected may transfer power using a wireless inductive coupling.

One or more wheel brakes 46 may be provided for braking the vehicle 10 and preventing motion of the vehicle 10. The wheel brakes 46 may be hydraulically actuated, electrically actuated, or some combination thereof. The wheel brakes 46 may be a part of a brake system 48. The brake system 48 may include other components to operate the wheel brakes 46. For simplicity, the figure depicts a single connection between the brake system 48 and one of the wheel brakes 46, and connections between the brake system 48 and the other wheel brakes 46 are implied. The brake system 48 may include a controller to monitor and coordinate the brake system 48. The brake system 48 may monitor the brake components and control the wheel brakes 46 for vehicle braking. The brake system 48 may respond to driver commands and may also operate autonomously to implement features such as stability control. The controller of the brake system 48 may implement a method of applying a requested brake force when requested by another controller or sub-function.

Electronic modules in the vehicle 10 may communicate via one or more vehicle networks. The vehicle network may include a plurality of channels for communication. One channel of the vehicle network may be a serial bus such as a Controller Area Network (CAN). One of the channels of the vehicle network may include an Ethernet network defined by Institute of Electrical and Electronics Engineers (IEEE) 802 family of standards. Additional channels of the vehicle network may include discrete connections between modules and may include power signals from the auxiliary battery 32. Different signals may be transferred over different channels of the vehicle network. For example, video signals may be transferred over a high-speed channel (e.g., Ethernet) while control signals may be transferred over CAN or discrete signals. The vehicle network may include any hardware and software components that aid in transferring signals and data between modules. The vehicle network is not shown in FIG. 1 but it may be implied that the vehicle network may connect to any electronic module that is present in the vehicle 10. A vehicle system controller (VSC) 50 may be present to coordinate the operation of the various components.

It is recognized that any circuit or other electrical device disclosed herein may include any number of microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof) and software which co-act with one another to perform operation(s) disclosed herein. In addition, any one or more of the electrical devices as disclosed herein may be configured to execute a computer-program that is embodied in a non-transitory computer readable medium that is programmed to perform any number of the functions as disclosed herein.

The transmission 14 has a case or housing 60, and the gearsets for the transmission 14 are contained within the case 60. The transmission 14 may be an automatic transmission, or another transmission as is known in the art. The transmission 14 may contains sets of meshed gears and clutches to provide various gear ratios for the vehicle 10. Additionally or alternatively, the transmission 14 may contain one or more planetary gearsets, which may function as a continuously variable transmission. Furthermore, the transmission 14 may include a torque converter in addition to or in place of one or more clutches.

As the transmission 14 operates, the transmission may require cooling and/or lubrication. As such, the transmission 14 has an associated fluid system that contains a transmission fluid. The fluid system is not shown in FIG. 1, but can be understood with later reference to FIG. 3. The transmission fluid system includes valves, pumps and conduits for circulating the fluid through the transmission housing 60. The transmission 14 includes a heat exchanger or automatic transmission fluid cooler for cooling the transmission fluid. The transmission may be configured as a wet sump system that stores the fluid in sump or pan at the bottom of the transmission. Alternatively, the transmission may be configured as a dry sump transmission that stores the fluid in a separate tank or reservoir, with the sump or pan at the bottom of the housing being kept in a dry or semi-dry state. When the transmission operates, rotating elements such as gears and shafts may displace or splash transmission fluid onto other components within the transmission housing 60.

Figure 2:
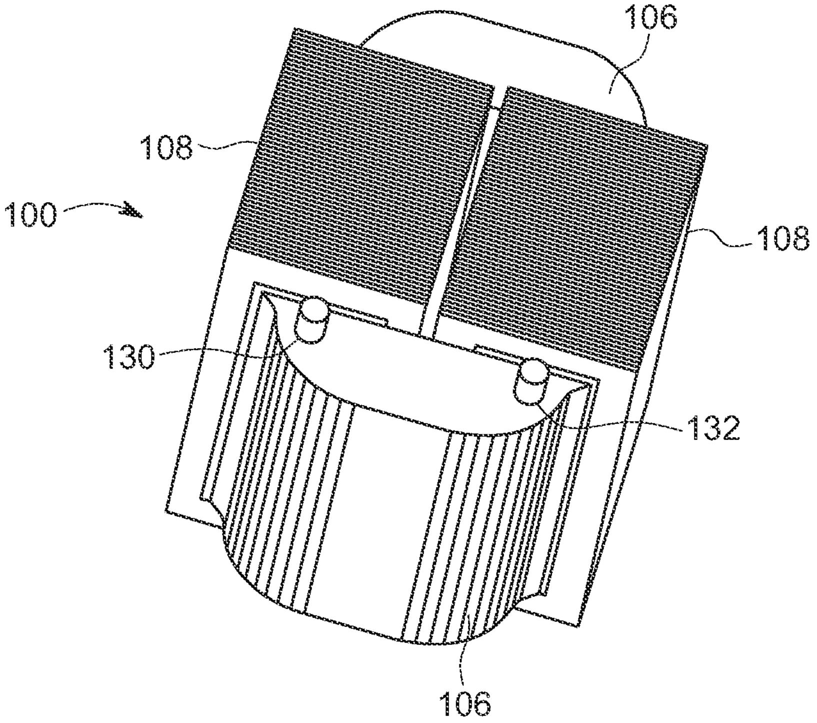
FIG. 2 illustrates a perspective view of an inductor assembly according to an embodiment.

FIG. 2 illustrates an inductor assembly 100 according to an embodiment. The inductor assembly 100 may also be referred to or be incorporated into a variable voltage converter (VVC) 28 or other vehicle power electronics system as described above with respect to FIG. 1. The VVC 28 may include any number of switches, transistors, diodes, and the like, which may be mounted in a separate location from the inductor assembly, and be in electrical communication with the inductor assembly. Note that FIG. 1 is a schematic view of the vehicle 10, and the components may be otherwise positioned or arranged within the vehicle.

The inductor assembly 100 may be mounted within a transmission case 60 as shown above in FIG. 1, such that it is in an interior, wet region of the housing 60. In other examples, the inductor assembly 100 may be mounted outside the transmission case 60 and at another location on a structural vehicle component in the vehicle 10. The transmission case 60 or vehicle component provides the structure to support the inductor assembly 100 on the vehicle 10.

The inductor assembly 100 may be provided as a ferro-magnetic-core type inductor. As current is supplied to the inductor assembly 100, a magnetic flux is generated. When the current flowing through the inductor assembly 100 changes, a time-varying magnetic field is created, and a voltage is induced. The inductor assembly 100 may have power losses that contribute to generation of heat during operation. The current capability of the inductor assembly 100 may be limited by the temperature or thermal performance of the inductor assembly. Thermal management and/or cooling of the inductor assembly may dissipate heat, and improve inductor performance and efficiency.

Figure 3:
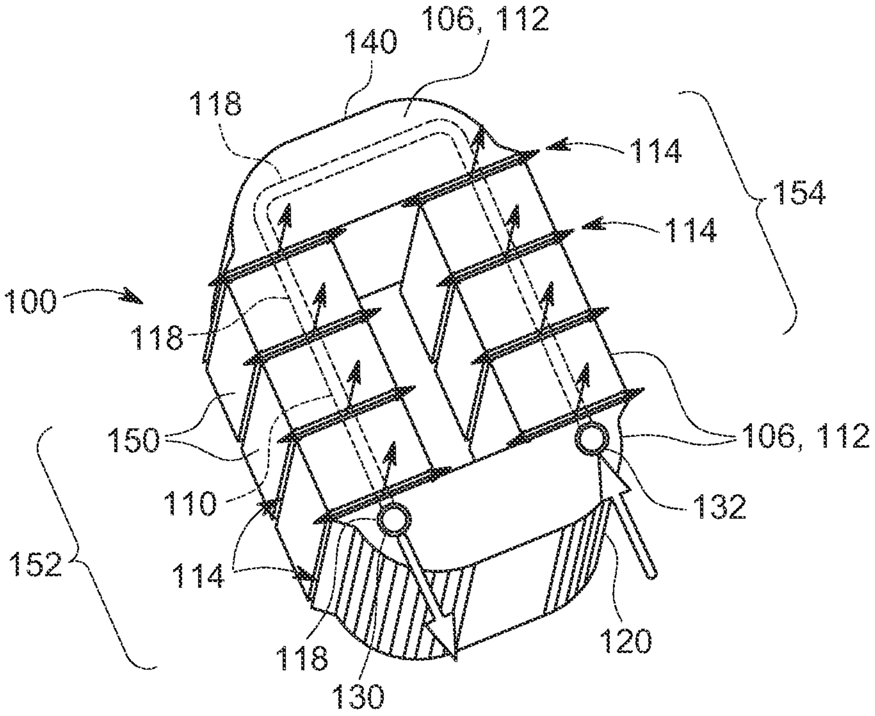
FIG. 3 illustrates a core of the inductor assembly of FIG. 2.
Figure 4:
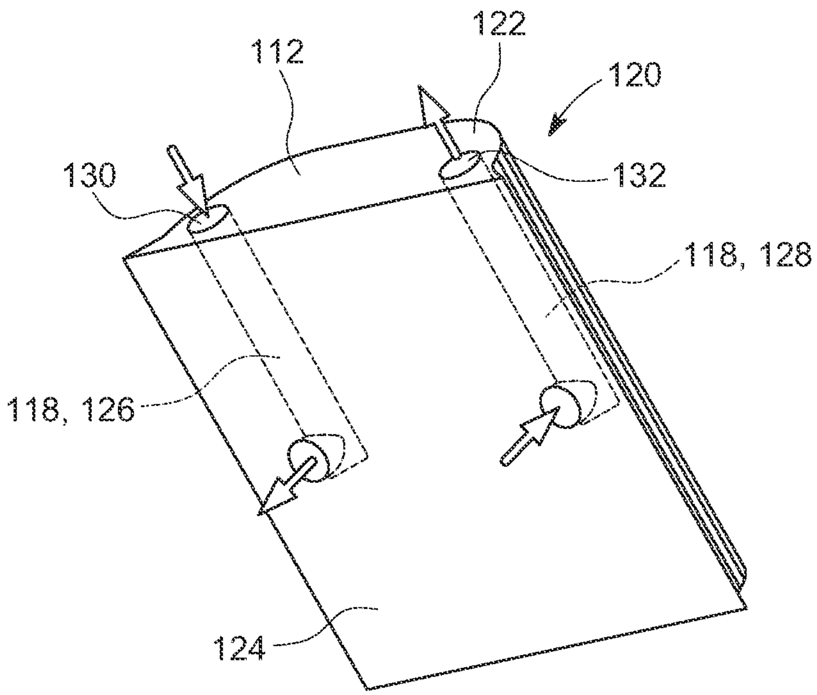
FIG. 4 illustrates a first end yoke of the core of FIG. 3.
Figure 5:
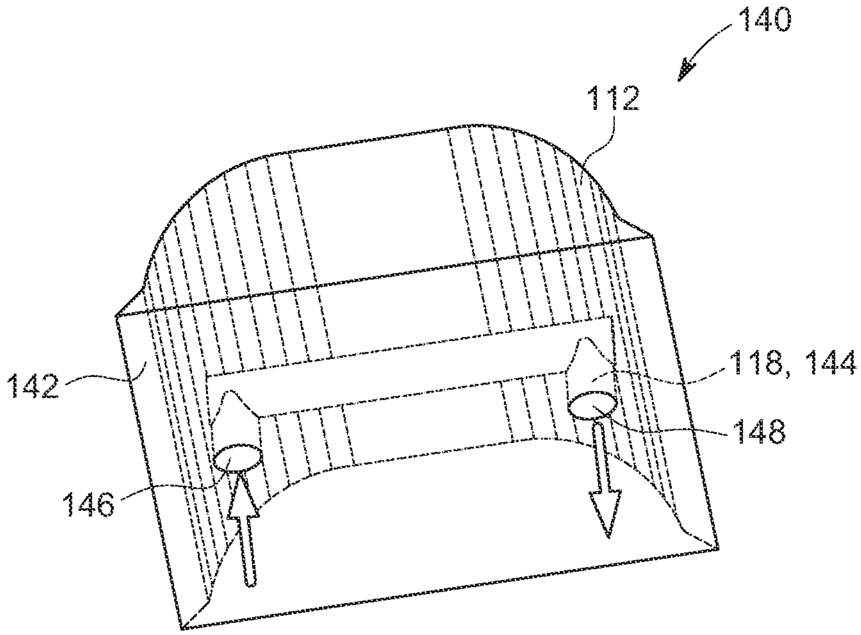
FIG. 5 illustrates a second end yoke of the core of FIG. 3.
Figure 6:
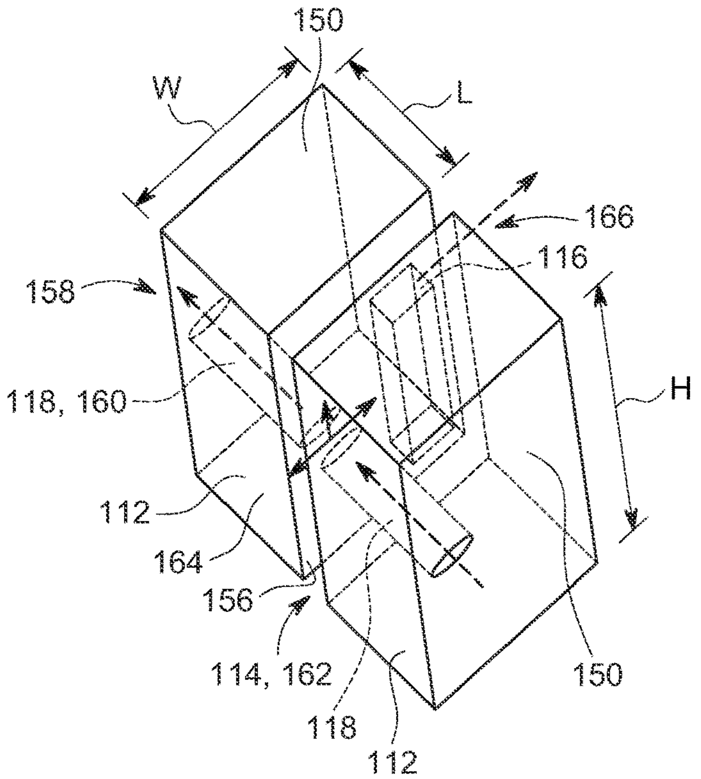
FIG. 6 illustrates two core segments of the core of FIG. 3.

The inductor assembly 100 is illustrated according to an embodiment and includes a core 106 and a winding 108. The core 106 may be formed from a plurality of sections or segments, as described below with respect to FIGS. 3-6. The core segments may collectively form a ring-shaped element, or an annular structure as shown in FIG. 3. As used herein, an annular structure may be circular, or may be a non-circular shape with a structure surrounding an aperture, such as a central aperture.

Referring back to FIG. 2, the winding 108 may be formed as a pair of tubular or helical coils, with each coil surrounding a portion of the core 106. In the example shown, the inductor assembly 100 therefore has a first winding and a second winding. The winding 108 may be formed from a conductive material, such as copper. Input and output leads (not shown) extend from the winding 108 and connect to other components of the VVC. An insulator (not shown) may be positioned between the core 106 and the winding 108.

According to one example, the winding 108 is a sealed winding such that fluid cannot cross the winding 108, or flow from the core 106 through the winding 108 and outside of the inductor assembly 100. In another example, the winding 108 may be unsealed such that fluid may flow through from the core 106 through the winding 108 and outside of the inductor assembly 100. The unsealed winding 108 may have gaps or other spaces or apertures through the winding 108 that form a series of fluid outlets from the winding 108 to allow at least a portion of the fluid flow inside the core 106 to exit the inductor assembly 100.

FIGS. 3-6 illustrate the core 106 of the inductor assembly 100. The core 106 forms a fluid circuit 110 within the inductor assembly 100. The fluid circuit 110 within the core 106 provides active thermal management of the core 106 from the inside, e.g. via convective cooling to the fluid. The core 106 is made up of a plurality of core segments 112. The segments 112 of the core 106 may be formed from a magnetic material, such as a ferro-magnetic material.

The inductor assembly 100 may be assembled by positioning the core segments 112 and the windings 108 relative to one another. A bobbin may be provided, for example, via injection molding, to seal the core 106 and winding 108 together.

The core segments 112 are spaced apart from one another such that a gap 114 is defined between adjacent segments 112. A spacer element 116 may be positioned between adjacent segments 112 to maintain the spacing between the segments, and maintain the size of the gap 114. The spacer element 116 may be formed from a ceramic material, or other suitable material.

Each of the core segments 110 has at least one internal fluid passage 118 formed through the associated segment 112.

One of the plurality of core segments 112 is a first end yoke 120. The first end yoke 120 has a first face 122 and a second face 124. In the example shown, the first and second faces 122, 124 are perpendicular to one another. In another example, the first and second faces 122, 124 may be parallel to one another or may be arranged at another angle relative to one another. The first and second faces 122, 124 may each be a planar face as shown. The first face 122 may be provided as an outer surface of the inductor assembly 100. The second face 124 may be adjacent to leg core segments as described below and associated gaps 114.

The first end yoke 120 has a first internal fluid passage 126, and a second internal fluid passage 128. The first fluid passage 126 intersects the first face 122 and the second face 124 of the first end yoke 120. The second fluid passage 128 intersects the first face 122 and the second face 124 of the first end yoke 120. The first and second fluid passages 126, 128 do not intersect one another.

The first internal fluid passage 126 intersects the first face 122 to define a first port 130 for the inductor assembly 100, and the second internal fluid passage 128 intersects the first face 122 to define a second port 132 for the inductor assembly 100. The first and second ports 130, 132 of the first yoke 120 are spaced apart from one another, and connect the fluid circuit 110 in the inductor assembly 100 to a fluid system as described below such that pressurized fluid may be provided to the fluid circuit.

Another of the plurality of core segments is a second end yoke 140. The second end yoke 140 may be positioned opposite to the first end yoke 120, as shown in FIG. 3. The second end yoke 140 has a first face 142. The internal fluid passage 144 of the second yoke 140 may be curved, or otherwise shaped such that the internal fluid passage 144 intersects the first face 142 to define a first port 146 and a second port 148. The first and second ports 146, 148 of the second yoke 140 are spaced apart from one another.

A reminder of the plurality of core segments 112 are positioned between the first and second end yokes 120, 140. The remainder of the core segments 112 may be provided as leg cores 150. Based on the annular structure of the core 106, the leg cores 150 are arranged into a first series 152 of leg cores and a second series 154 of leg cores, with the second series 154 of leg cores on an opposite side of the aperture of the annular structure relative to the first series 152.

Each of the leg cores 150 may be formed with a first face 156 and a second face 158 opposite to the first face 156. The internal fluid passage 160 of each leg core 150 intersects the first and second faces 156, 158. In the example shown, the core 106 has eight core segments 112, with two core yokes 120, 140 and six leg cores 150. The leg cores 150 may be cuboid with six faces as is shown in the figures. In other example, the leg cores 150 may be shaped otherwise, and a greater or fewer number of core segments 112 may be used for the core 106.

In the example shown, each of the leg cores 150 has the same length (L), width (W), and height dimensions (H). In other examples, the leg cores 150 may be sized with different lengths (L) relative to one another. In further examples, the internal passage 160 in each leg core 150 may be the sole internal passage through the leg core 150.

According to the example shown, the second face 124 of the first yoke 120, the first face 142 of the second yoke 140, and the first and second faces 156, 158 of the leg cores 150 may all be parallel to one another. In other examples, at least some of the faces 124, 142, 156, 158 may be angled to be nonparallel relative to one another.

The spacer 116 is sized be to control the width of the gap between adjacent core segments 112, and helps to define a cavity 162 between the adjacent core segments 112 when the inductor assembly 100 is assembled. The cavity 162 fills with fluid to cool the core segments, and to cool the winding 108 from the inside of the inductor assembly 100. Fluid flowing through the internal fluid passages 118 inside the core 106 cools the core 106 during operation. By increasing the number of core segments 112, additional gaps 114 and cavities 162 are provided, which provide additional surface area for contact between the fluid and the core segments 112 and the winding 108, and further increase cooling and thermal management of the inductor assembly 100.

As the magnetic flux for the core 106 is higher towards the center of the core 106, the fluid passages 1128 in the core segments 112 are positioned towards the outside of the core 106 to reduce or minimize effects on inductor performance.

Each of the leg cores 150 has an outer face 164 and an inner face 166 defining the width (W) therebetween, the first and second faces 156, 158 extending between and connecting the inner and outer faces 164, 166. The internal fluid passage 160 of each of the leg cores 150 positioned at a distance within twenty percent of the width (W) from the outer face 164. In a further example, the internal fluid passage 160 is positioned away from the outer face 164 at a distance of ten percent of the width (W), and is therefore positioned a distance of ninety percent of the width (W) from the inner face 166. According to the example shown, the internal fluid passage 160 for the leg cores 150 is located a distance of ten percent of the core width (W) from the outer face 164, and at fifty percent of the leg core height (H). In other examples, the positioning of the fluid passage 160 on the leg core 150 may be provided at another location relative to the core width (W) and height (H).

The core 106 of the inductor assembly 100 may be assembled such that the internal fluid passages 118 of adjacent faces of adjacent segments 112 are aligned with one another. In the non-limiting example shown, the internal fluid passages 160 of the leg cores 150 lie within a common plane through the core.

According to one example of the inductor assembly 100, the core 106 is formed by sequentially arranging the first end yoke 120, the first series 152 of leg cores 150, the second end yoke 140, and the second series 154 of leg cores 150 into an annular structure as is shown in FIG. 3. The first port 130 of the first yoke 120 forms a fluid inlet or inlet port, and the second port 132 of the first yoke 120 forms a fluid outlet or outlet port. Fluid therefore flows sequentially through the fluid inlet 130 of the first end yoke 120, the internal passage 126 of the first end yoke, the internal passages 160 of the first series 152 of leg cores 150, the internal fluid passage 144 of the second end yoke 140, the internal passages 160 of the second series 154 of leg cores 150, through the another internal passage 128 of the first end yoke, and to the fluid outlet 132 of the first end yoke.

According to another example of the inductor assembly 100, the core 106 is formed by sequentially arranging the first end yoke 120, the first series 152 of leg cores 150, another end yoke with two internal fluid passages as in the first end yoke 120 described above, and the second series 154 of leg cores 150 into an annular structure. The first port 130 of the first yoke 120 forms a first fluid inlet and the second port 132 of the first yoke 120 forms a second fluid inlet. The first port of the another end yoke forms a first fluid outlet and the second port of the another end yoke forms a second fluid outlet. Fluid flow through the inductor assembly 100 therefore flows through one of two parallel, co-flow, separate paths. Fluid flows either (i) sequentially into the first inlet 130 of the first end yoke 120, through the first series 152 of the leg cores, and out of the first outlet of the another end yoke, or (ii) sequentially into the second inlet 132 of the first end yoke 120, through the second series 154 of the leg cores 150, and out of the second outlet of the another end yoke According to another example of the inductor assembly 100, the core 106 is formed by sequentially arranging the first end yoke 120, the first series 152 of leg cores 150, another end yoke with two internal fluid passages as in the first end yoke 120 described above, and the second series 154 of leg cores 150 into an annular structure. The first port 130 of the first yoke 120 forms a first fluid inlet and the second port 132 of the first yoke 120 forms a first fluid outlet. The first port of the another end yoke forms a second fluid inlet and the second port of the another end yoke forms a second fluid outlet. Fluid flow through the inductor assembly 100 therefore flows through one of two parallel, counterflow, separate paths. Fluid flows either (i) sequentially into the first inlet 130 of the first end yoke 120, through the first series 152 of the leg cores 150, and out of the first outlet of the another end yoke, or (ii) sequentially into the second inlet of the another end yoke, through the second series 154 of the leg cores 150, and out of the first outlet 132 of the first end yoke 120.

Figure 7:
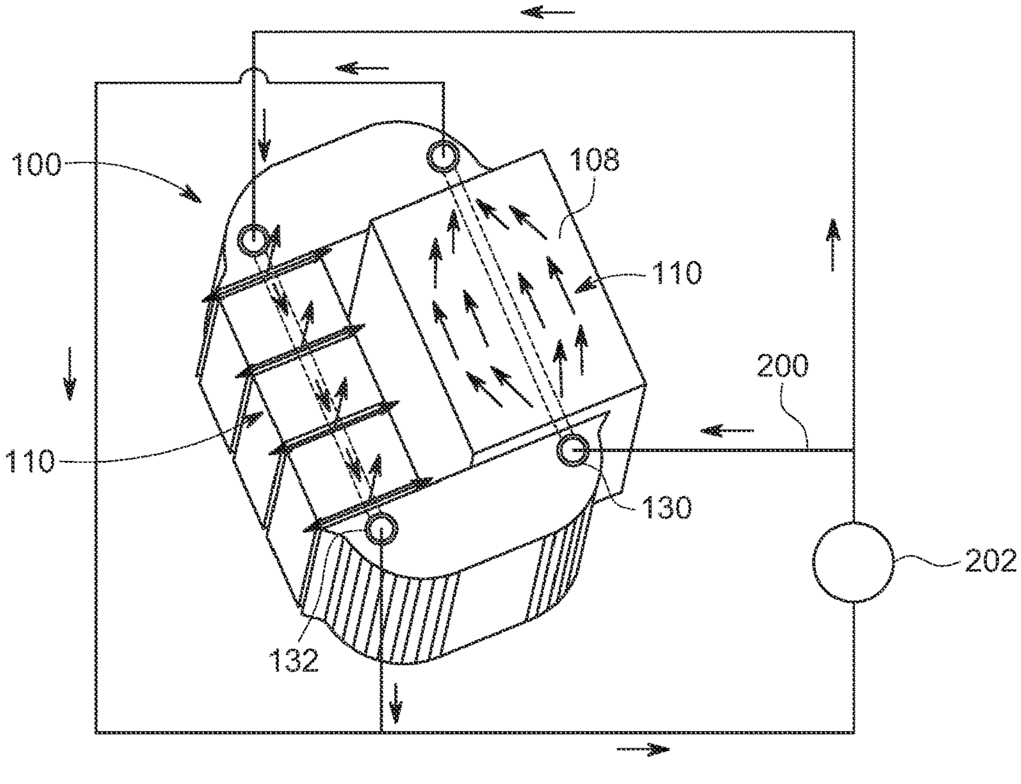
FIG. 7 illustrates a partial schematic view of an inductor assembly and a fluid system according to an embodiment.
Figure 8:
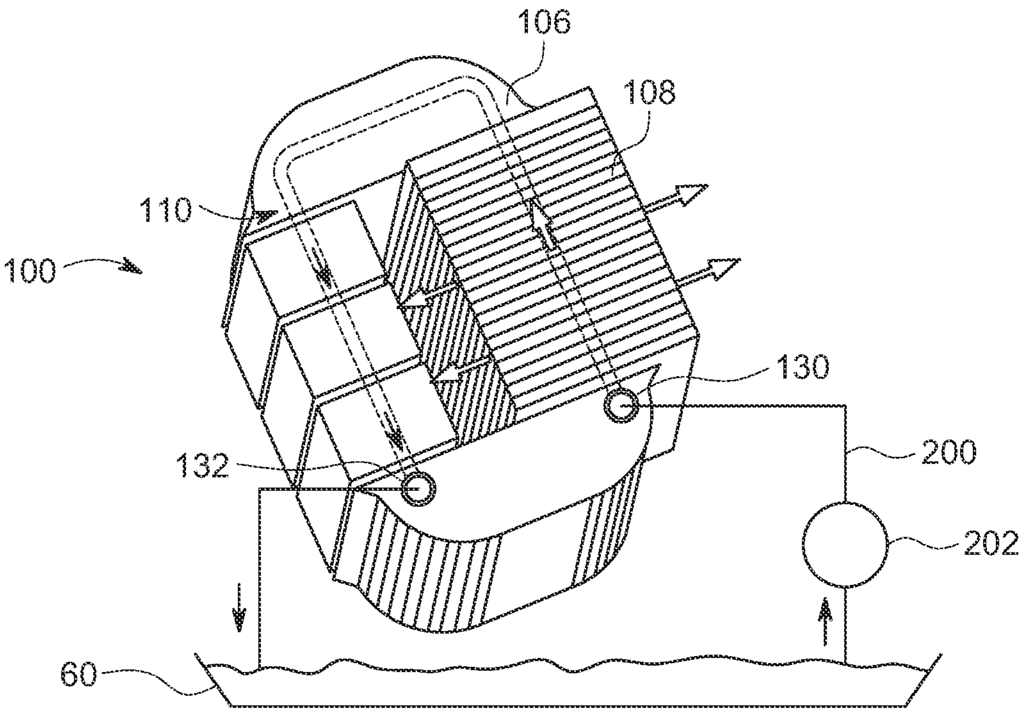
FIG. 8 illustrates a partial schematic view of an inductor assembly and a fluid system according to another embodiment.

FIGS. 7-8 illustrate partial views of the inductor assembly 100 and fluid systems 200 according to various examples. The inductor assembly 100 and fluid system 200 may be used with the vehicle 10 of FIG. 1. For FIGS. 7-8, only one winding 108 is illustrated for the inductor assembly, and the other winding is not shown. The inductor assembly of FIG. 8 with an unsealed winding may additionally be used with the fluid system 200 of FIG. 7. The multi-inlet inductor assembly of FIG. 7, with either the sealed or permeable winding of FIGS. 7-8 may be used with the fluid system 200 of FIG. 8.

As the fluid flow enters the core 106 of the inductor assembly 100, the fluid flows through the internal passages in the core 106, into the cavities 162, and around the fluid circuit 110. Depending on the structure of the winding 108, at least a portion of the fluid may additionally flow from the gaps through the winding 108, as is shown in FIG. 8. As the fluid flow is in direct contact with the core 106 of the inductor assembly 100, heat transfer from the inductor assembly 100 to the fluid is increased via both convective and conductive heat transfer pathways.

As shown in FIGS. 7-8, a fluid system 200 is connected to the fluid inlet(s), and the fluid outlet(s) to provide pressurized fluid to the inlet(s) to circulate fluid through the fluid circuit 110 in the inductor assembly 100. A pump 202 is provided in the fluid system 200 to pressurize the fluid. The fluid system 200 may be an open loop system as shown in FIG. 8 or a closed loop system as shown in FIG. 7. The fluid inlet(s) of the inductor assembly 100 are in fluid communication with and downstream of an outlet of the pump 202. The fluid outlet(s) of the inductor assembly 100 may be in fluid communication with a sump, a reservoir, or the like based on whether the fluid system is an open loop or closed loop system.

According to a further example, the fluid system 200 is in fluid communication with or fluidly connected to the transmission 14 fluid system, such that the fluid in the fluid system 200 is transmission fluid.

For an open loop system fluidly connected to the transmission 14 as shown in FIG. 8, the pump 202 of the fluid system 200 receives fluid from a sump or other reservoir in the transmission case 60, directs pressurized fluid to the inlet(s) of the inductor assembly 100, and the outlet(s) of the inductor assembly 100 open into an interior region of the transmission case 60 such that the fluid drains out of the inductor assembly 100 and into the sump.

For a closed loop system as shown in FIG. 7, the pump 202 of the fluid system 200 directs pressurized fluid to the inlet(s) of the inductor assembly 100, and the outlet(s) of the inductor assembly 100 are connected to fluid lines to direct pressurized flow of the fluid back to the pump 202. In either system, additional elements such as a heat exchanger, valves, filters and the like may be provided.

The winding 108 may be a permeable winding or a sealed winding when the inductor assembly 100 is positioned within a wet environment, such as within the transmission case 60.

While exemplary embodiments are described above, it is not intended that these embodiments describe all possible forms of the invention or disclosure. Rather, the words used in the specification are words of description rather than limitation, and it is understood that various changes may be made without departing from the spirit and scope of the disclosure. Additionally, the features of various implementing embodiments may be combined to form further embodiments of the invention or disclosure.

What is claimed is:

1. An inductor assembly for power electronics in a vehicle, the assembly comprising:

a core assembly including:

a first end yoke defining at least one internal fluid passage therethrough, a second end yoke opposite to the first end yoke, the second end yoke defining an internal fluid passage therethrough, a first series of core segments positioned between the first and second end yokes, each of the segments being spaced apart from one another such that a gap is defined between adjacent segments, and a second series of core segments positioned between the first and second end yokes, a core and a winding, each of the segments being spaced apart from one another such that a gap is defined between adjacent segments, wherein the first end yoke, the first series of core segments, the second end yoke, and the second series of core segments are sequentially arranged into an annular structure, wherein the internal fluid passages cooperate to define a fluid circuit through the core, the gaps between the first and second series of core segments in fluid communication with the fluid circuit, wherein the first end yoke defines an inlet for the fluid circuit, the inlet in fluid communication with the at least one internal fluid passage of the first end yoke, and wherein one of the first and second end yokes defines an outlet for the fluid circuit;

a first winding surrounding the first series of core segments; and a second winding surrounding the second series of core segments.

2. The inductor assembly of claim 1 wherein each core segment of the first series of core segments has a first face and a second face opposite thereto, the internal fluid passage of each core segment of the first series of core segments intersecting the associated first face and the associated second face.

3. The inductor assembly of claim 2 wherein one of the first and second faces of each core segment of the first series of core segments faces an adjacent core segment of the first series of core segments.

4. The inductor assembly of claim 2 wherein each core segment of the first series of core segments has an outer face and an inner face defining a width therebetween, the first and second faces extending between and connecting the inner and outer faces, wherein the internal fluid passage of each core segment of the first series of core segments is positioned within twenty percent of the width from the outer face.

5. The inductor assembly of claim 1 wherein the first end yoke defines a first face and a second face, the internal fluid passage of the first end yoke intersecting the associated first and second faces.

6. The inductor assembly of claim 5 wherein the first end yoke defines another internal fluid passage extending therethrough, wherein the another internal passage of the first end yoke intersects the associated first and second faces.

7. The inductor assembly of claim 6 wherein the first face of the first end yoke intersects the second face of the first end yoke.

8. The inductor assembly of claim 6 wherein the internal fluid passage of the first end yoke intersects the first face to define the fluid inlet for the inductor assembly.

9. The inductor assembly of claim 8 wherein the another internal fluid passage of the first end yoke intersects the first face to define the fluid outlet for the inductor assembly.

10. The inductor assembly of claim 9 wherein the second end yoke defines a first face, the internal fluid passage of the second end yoke intersecting the first face to define a first port and a second port spaced apart therefrom.

11. The inductor assembly of claim 6 wherein the internal fluid passage of the first end yoke intersects the first face to define one of a first fluid inlet and a first fluid outlet for the inductor assembly, and wherein the another internal fluid passage of the first end yoke intersects the first face to define one of a second fluid inlet and a second fluid outlet for the inductor assembly; and wherein the second end yoke defines a first face and a second face, the second end yoke defining another internal fluid passage extending therethrough, wherein each of the internal passage and the another internal passage of the second end yoke intersect the associated first and second faces.

12. The inductor assembly of claim 11 wherein the internal fluid passage of the second end yoke intersects the first face thereof to define the other of a first fluid inlet and a first fluid outlet for the inductor assembly, and wherein the another internal fluid passage of the second end yoke intersects the first face thereof to define the other of a second fluid inlet and a second fluid outlet for the inductor assembly.

13. The inductor assembly of claim 1 wherein the winding is sealed such that fluid flow through the inductor assembly is contained by the winding.

14. The inductor assembly of claim 1 wherein the winding is permeable to fluid flow such that a plurality of fluid outlets are formed by the winding.

15. The inductor assembly of claim 1 wherein the inductor assembly further includes a plurality of spacers, each spacer positioned within a respective gap between adjacent core segments.

* * * * *